United States Patent [19]
Selig et al.

[11] Patent Number: 5,764,726
[45] Date of Patent: *Jun. 9, 1998

[54] TELECOMMUNICATIONS TEST SYSTEM INCLUDING A TEST AND TROUBLE SHOOTING EXPERT SYSTEM

[75] Inventors: Kenneth Robert Selig; Onofrio Schillaci, both of Camarillo, Calif.

[73] Assignee: Harris Corporation, Melbourne, Fla.

[*] Notice: The term of this patent shall not extend beyond the expiration date of Pat. No. 5,521,958.

[21] Appl. No.: 629,289

[22] Filed: Apr. 8, 1996

Related U.S. Application Data

[63] Continuation of Ser. No. 235,317, Apr. 29, 1994, Pat. No. 5,521,958.
[51] Int. Cl.$^6$ .................... H04M 1/24; H04M 3/08; H04M 3/22
[52] U.S. Cl. .................... 379/21; 379/27; 455/67.1; 455/423
[58] Field of Search .................... 379/1, 21, 27, 379/29, 32, 33, 58, 59, 61, 57, 6, 9–10, 12, 15, 22–24; 455/33.1, 33.2, 67.1, 66, 423, 424, 425

[56] References Cited

U.S. PATENT DOCUMENTS

| | | | |
|---|---|---|---|
| 4,922,516 | 5/1990 | Butler et al. | 379/21 |
| 4,977,399 | 12/1990 | Price et al. | 455/424 |
| 5,408,520 | 4/1995 | Clark et al. | 379/93 |
| 5,438,329 | 8/1995 | Gastouniotis et al. | 455/67.1 |
| 5,521,958 | 5/1996 | Selig et al. | 379/21 |

Primary Examiner—Paul Loomis
Assistant Examiner—Binh K. Tieu
Attorney, Agent, or Firm—Charles E. Wands

[57] ABSTRACT

A telecommunication test system for a line to be tested includes a test measurement device coupling with the line. The test measurement device determines parameter measurement data from the line. A processor receives the parameter measurement data. A first communication path between the test measurement device and the processor transmits the parameter measurement data. The first communication path is a wireless path. A mobile facility communicates with the processor. The communications are via a second communication path which includes a primary wireless path and a back-up wireline path. A central office and a data test place various signals on the line being tested. A third communication path between the mobile facility and at least one of the central office and the data test center is provided. The third communication path includes a primary wireless path and a back-up wireline path.

32 Claims, 15 Drawing Sheets

TELECOMMUNICATIONS TEST SYSTEM INCLUDING A TEST AND TROUBLE SHOOTING EXPERT SYSTEM

This is a continuation of application Ser. No. 08/235,317, filed Apr. 29, 1994, now U.S. Pat. No. 5,521,958.

REFERENCE TO MICROFICHE APPENDIX

This application references a microfiche appendix having one microfiche with a total of seventy-eight frames.

FIELD OF THE INVENTION

This invention relates to the field of telecommunication testing and, more particularly, to a portable telecommunications test system allowing for remote and simplified operation by a technician.

BACKGROUND OF THE INVENTION

Existing dispatch, testing and conditioning systems for the telecommunications field, such as for telephone systems and the like, operate according to known methods and procedures. For example, when a subscriber or customer initiates a service call via a call to an automated repair service bureau, the administrator at the repair service bureau confirms the reported trouble and generates a trouble report or trouble ticket. Through the use of loop management operation systems, using flow through procedures, a technician, along with his vehicle, can be automatically dispatched to the proper location using a craft access system (CAS) or technician access network (TAN) in order to service the trouble report.

When this occurs, the dispatched technician is supplied with narratives indicating the type of trouble reported and detected, as well as customer information relative to the dispatch. The technician must be able to interpret the problem and identify the proper course of action in order to correct the trouble. In order to correct the trouble, the following steps are followed. Using CAS/TAN, the technician requests on-demand tests and conditions from a central office location. The central office location, via a line conditioning device, can then provide various test conditions over the telecommunications line to be tested, i.e., the "line under test". The technician must further coordinate the testing of the line with the proper portable test equipment or test head and ensure that correct test sequences are issued for the test head.

In the field of telecommunications testing, it has heretofore been known to provide an expensive and complicated test head for physically coupling with the line under test. The technician physically connects the known test head to the telecommunications line. These known test heads include various electronic circuits for coupling with the line under test, as well as a computer hard-wired thereto. The computer allows the technician to perform various tests on the line.

It is a major disadvantage of these known systems that the technician must conduct the tests on the line at the location where the test head couples to the line. In view of the test head being physically connected with a line at oftentimes difficult or barely accessible locations, the technician incurs added labor time in trying to conduct the tests via the hard-wired computer. Further, the technician is physically limited by the placement of the test head such that increased stress results due to the awkward postures which must be maintained. This often leads to back injuries and the like.

Further, the known systems allow only a limited number of testing applications to be performed in view of the limited capabilities of the test head. Still further, labor costs for customer service are increased due to the time required for the technician to set up the test head on the line. Also, the expensive cost of the known test heads increase the customer service costs. Even further, the testing applications that can be carried out with known test heads are limited because of the size of the computer integrated with the test head, as well as because of the accessibility of changing the software programs stored therein.

All of the above disadvantages are amplified in view of the tremendous competition in the telecommunications industry, wherein continuous reductions in the work force are leading to longer delays in customer service as well as a lessening of the quality and education of the technicians that are available.

Not only is it difficult for the technician to use the known test heads, the technician is also required to have a substantial knowledge of ever-changing subscriber loop and other support systems in order to carry out various tests on the line. Without this knowledge, technicians often attempt ineffective solutions to the trouble report such as the swapping of line cards, cutting to clear, etc, when other, less drastic, solutions are available.

Another disadvantage with the known methods and procedures is that inadequately trained technicians may not be able to solve a customer's trouble in the allotted time frame. This can further have a side effect on other allotted time frames since the technician may require the assistance of other dispatched technicians, thus decreasing the overall efficiency of the dispatch testing and conditioning network of technicians.

There is therefore needed a user friendly portable telecommunications test and trouble shooting expert system which overcomes the above disadvantages. The trouble shooting expert system must efficiently address the customer's troubles while meeting the needs of an efficient work force within the telecommunications industry.

SUMMARY OF THE INVENTION

The present invention meets these needs by providing a portable telecommunications test system using a generic test head for coupling to a line under test as well as a non-integrated hand-held personal computer in communication with the test head. The hand-held personal computer communicates with the generic test head in a wireless fashion. This allows the technician to have increased mobility at the customer test site. Further, by incorporating the intelligence of the test head in the hand-held personal computer, a low cost, portable test measurement device, i.e., the test head, can be used. Thus, it is also possible in preferred embodiments to permanently install the test head at a customer site such that it can be operated via a remote site using the hand-held personal computer.

It is a further advantage of the present invention that the hand-held personal computer allows for easy software upgradability and future expansion of the testing system.

The present invention also provides for a user friendly, dispatch, test and trouble shooting expert system operable via the hand-held personal computer. This allows for complete and expedient testing of the customer site than was previously possible via a lower skilled technician, without requiring extensive training. The application software operable on the hand-held personal computer provides the technician with an easy, step by step, procedure to perform various tests on the line.

The application software further allows the technician's hand-held personal computer to interact with all types of existing operational support systems as well as providing a platform for future information exchanges. The application software provides an icon-based, user friendly graphics interface for the technician using the hand-held personal computer.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
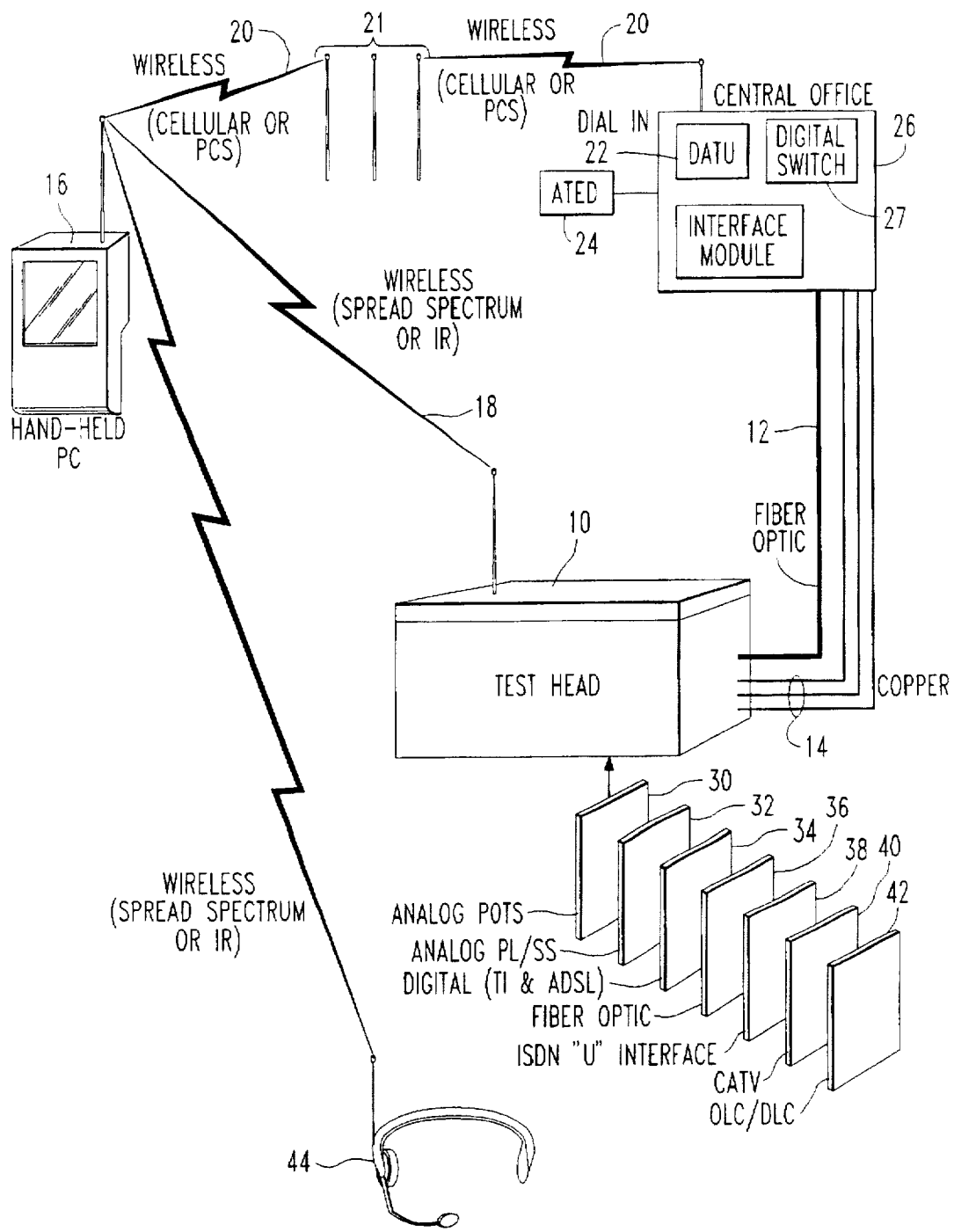
FIG. 1 is a schematic block diagram representation of a wireless portable telecommunications testing system in accordance with the present invention.

Referring to the schematic block diagram of FIG. 1 illustrating a portable telecommunications test system according to the present invention, a portable, remote test measurement device 10, i.e., a test head, is provided. The test head 10 can be coupled to a line under test such as a fiber optic line 12 or twisted copper tip/ring and ground conductors 14. The test head 10 determines various parameter measurements on the line under test 12, 14. The parameter measurements from the test head 10 are communicated to a portable personal computer 16. The personal computer 16, in a preferred embodiment, can be a hand-held personal computer such as the Newton™ manufactured by Apple Corporation. The personal computer 16 communicates with the test head 10 via a wireless signal 18. For example, the wireless signal 18 can be of a spread spectrum or infrared type of transmission signal.

The hand-held personal computer 16 receives the raw measured data from the test head 10 and operates on the data to convert the measurement results into usable parameter information. This usable parameter information is then transmitted, also via a wireless signal 20, to a line conditioning device 22 or an automated test equipment device 24 located in a central office 26. As shown in FIG. 1, the wireless transmission can be, for example, an analog cellular transmission via a cell 21 or a digital personal communications transmission (not shown). In a preferred embodiment as will be described with respect to FIG. 2, wireless communications can also be made with a data center for access to outside support systems such as those that have been developed by AT&T.

In the central office 26, the line conditioning device 22, which receives the information and directions from the hand-held personal computer 16 via DTMF commands, responds to the hand-held personal computer 16 with synthesized voice through a voice responsive system by dialing the telephone circuit or line under test 12, 14. It is also possible to use a modem 27 by which the line conditioning device 22 receives the information and directions from the hand-held personal computer 16. The line conditioning device 22 then places different test conditions onto the line under test 12, 14 such as, for example, opens, shorts, tones, quiet terminations, etc. The line conditioning device 22 operates at the direction of the hand-held personal computer 16. One example of a line conditioning device is the direct access test unit (DATU) product manufactured by Harris Corporation and described in U.S. Pat. Nos. 4,670,898 and 4,841,560, the specifications of which are hereby incorporated by reference herein.

A low cost, generic test head 10 can include a number of plug-in cards for coupling with various lines to be tested. For example, the following plug-in cards can be used in the test head 10: an analog telephone circuit card 30; an analog PL/SS card 32; a digital card 34 for coupling with high speed digital circuits such as T1, E1, fractional T1, etc.; a fiber optic card 36 for coupling with a fiber optic line such as line 12 in FIG. 1; an ISDN "U" interface card 38 for coupling with an ISDN line; a community access TV (CATV) card 40 for coupling with a CATV transmission; and an optical loop carrier/digital loop carrier card 42. In alternative embodiments, the plug-in cards 30–42 can take the form of software or hardware added to the hand-held PC 16 or the test head 10.

As also shown in FIG. 1, a voice activated, wireless headset 44 can be used by the technician for wireless communications with the hand-held PC 16. The wireless headset 44 can be used with the hand-held PC 16 and test head 10 to run automated tests via the voice response system, with an audio go/no-go indication of the test results being provided to the technician.

In the event of a customer service request, the portable telecommunications test system of the present invention is operated as follows. A technician dispatched to the test site physically couples the test head 10 to the line under test, such as fiber optic line 12 or twisted copper lines 14. As noted above, the test head 10 can connect to various transmission media via the use of specific plug-in cards. Through the use of the plug-in cards 30–42, the test head 10 can be used to test regular telephones or special service analog/digital telephone circuits, high-speed digital circuits such as T1, E1, fractional T1 and the like, video circuits such as CATV, ADSL, HDSL, video dial-tone, etc.

Once the test head 10 is coupled to the line under test, the technician uses the hand-held PC 16 to establish communications with the test head 10 via a wireless signal such as a spread spectrum or infrared type link. The hand-held PC 16 then communicates with the central office's line conditioning device 22 via a wireless transmission such as an analog cellular telephone or digital personal computer system. The hand-held PC 16 can then be used to direct the line conditioning device 22 to place different test conditions onto the line under test. These test conditions can be, for example, shorts, opens, quiet terminations, tones, etc.

The test head 10 then measures the different conditions placed on the line under test via the hand-held personal computer 16. The results from the test head 10 are wirelessly transmitted to the hand-held personal computer 16.

The hand-held personal computer 16 then takes the raw data transmitted from the test head 10 and processes the data into usable information. Based upon the results of the processed information, the hand-held PC 16 can direct the line conditioning device 22 to place different conditions onto the line under test. This cycle continues until the line has been completely tested.

Figure 2:
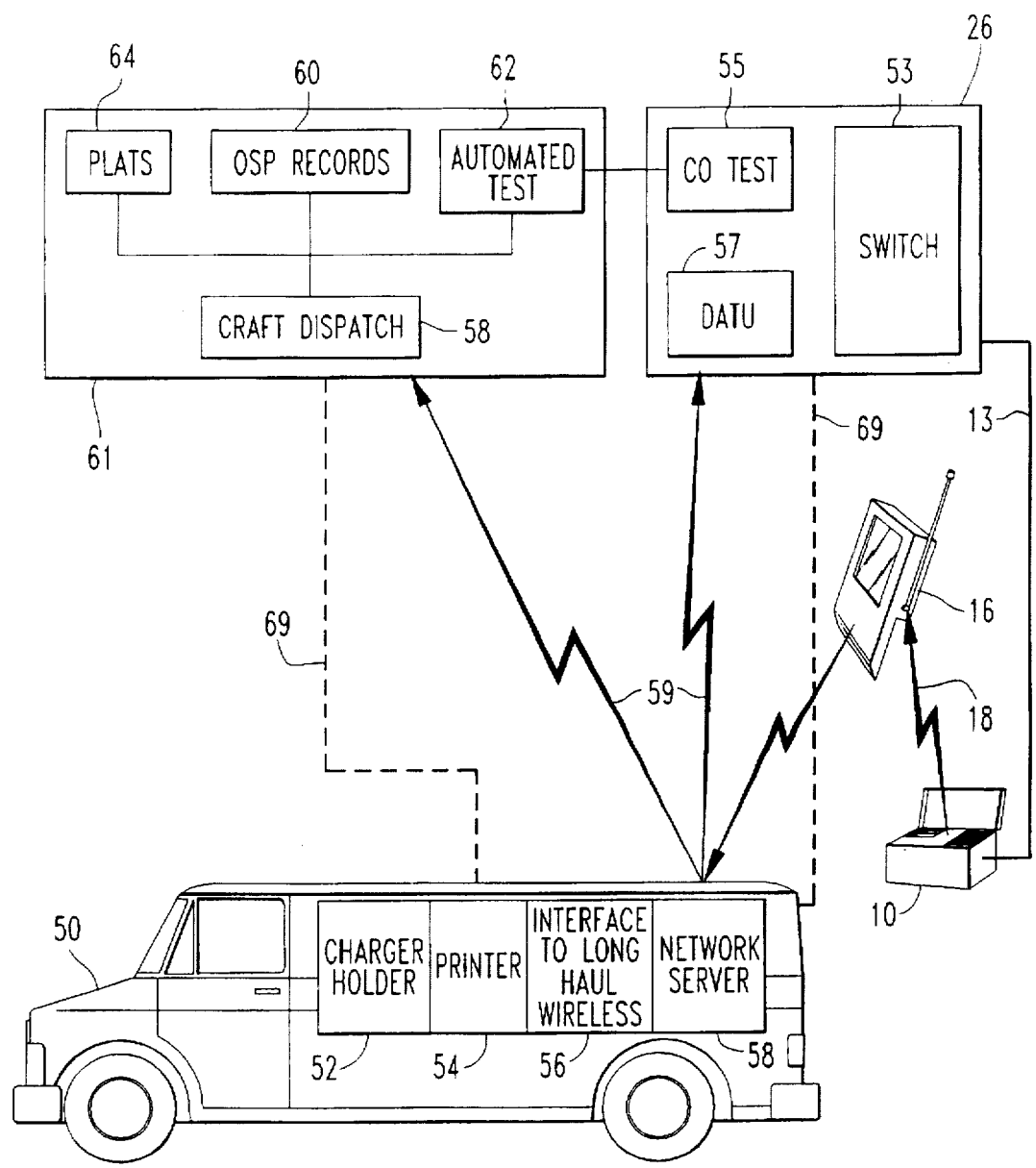
FIG. 2 is a schematic block diagram of a preferred embodiment of a portable telecommunications testing system according to the present invention.

Referring to FIG. 2, there is shown a preferred embodiment of a portable telecommunications test system. A test head 10 is coupled with a line under test 13 from a central office 26. The test head 10 communicates with a hand-held personal computer 16. The test head 10 performs all data acquisition on demand from the personal computer 16. This includes functional tests such as capacitive and resistive fault location, noise tests, loss, transmission, TDR, etc. The test head 10 and hand-held personal computer 16, as noted above with respect to FIG. 1, are expandable through the use of plug-in cards and software programs for coupling with various lines such as fiber optic lines and coaxial cables.

The hand-held personal computer 16 communicates with a technician's vehicle 50 which can forward the directions from the personal computer 16 to the central office 26 or to a data center 61. These communications can occur in a wireless fashion 59 as was discussed above with respect to FIG. 1, or via a back-up wired line 69 (shown in a dashed manner) depending upon the situation.

Inside the technician's vehicle 50, there is located a charge holder 52, printer 54, a long haul wireless interface 56 and a network server 58. The charge holder 52 operates to provide power for the test system. The printer 54 is available to print out various test results or other information. The interface 56 provides a short-haul wireless gateway to long haul wireless services, i.e., from spread spectrum transmissions to RAMS, ARDIS, COPD, cellular, CDMA, etc. The network server 58 provides additional processing power and electronic storage. The server 58 can also perform on demand from the hand-held PC 16 storage and batch mode requests for network schematics.

Within the central office 26, there is located the central office switch 53, central office test devices 55, and a line conditioning device such as the DATU line conditioning device 57 produced by Harris-Corporation.

The central office test devices 55 can provide an interface with various operational support systems such as a vehicle dispatch 58, outside plant record database 60, automated testing systems 62 such as MLT, ALIT, SASS, etc., and electronic network schematics 64. These other support systems form the data center 61. For example, the SASS system provides a telephone ring back apparatus for use by the technician. The SASS system is described in U.S. Pat. No. 4,764,949 assigned to Harris Corporation.

The portable telecommunications test system according to the present invention essentially is a local area network wherein the personal computer 16 is the client and the elements within the technician's van 50 and the portable test gear 10 are the servers.

The personal computer 16 provides a user friendly interface to the technician through the use of icons. The personal computer 16 is responsible for communications, information management and test sequence orchestration for the test system. With respect to the communications, in a preferred embodiment, the personal computer 16 uses short haul wireless signals in order to communicate with the portable test head 10 and the technician van 50. A wireline back-up modem can also be provided. The personal computer 16 can interface with other support systems such as the outside plant record database, the automated testing systems, the electronic network schematics, as well as the DATU product discussed above.

In accordance with the application software, the personal computer 16 fully integrates the dispatch system information to automate subsequent requests to the other support systems for information and testing. The application software further extends the information integration to allow automated trouble shooting based on dispatch and reactional testing. The personal computer 16 also orchestrates the test sequence for the line under test 13.

The operation of the personal computer 16 through the use of the application software will be described below with reference to FIGS. 3–15, wherein the data flow is discussed with reference to the user friendly graphic screens of the personal computer 16. A complete copy of the application software, in a source code format, is attached as a microfiche appendix.

Figure 3:
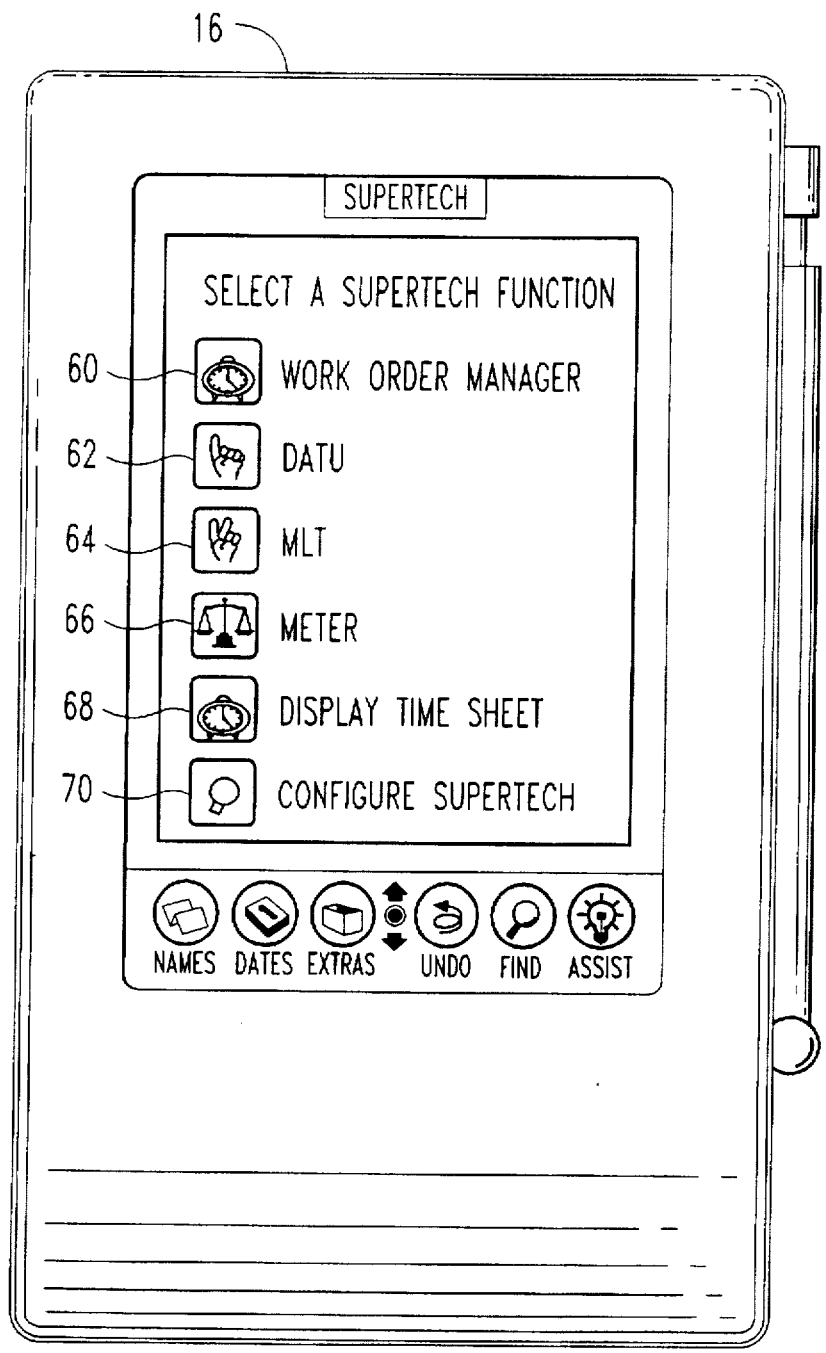
FIGS. 3–15 are screen representations indicating the data flow in accordance with the application software of the present invention.

With reference to FIG. 3, once the technician has coupled the test head 10 to the line under test, the application software operating on the hand-held personal computer 16 queries the technician to select a function for evaluating the telecommunications line. These functions include, for example, a work order manager 60, DATU 62, MLT 64, meter 66, display time sheet 68, and a configuration function 70. The application software provides for the use of easily selectable icons 62–70 for the technician to select the appropriate function.

Figure 4:
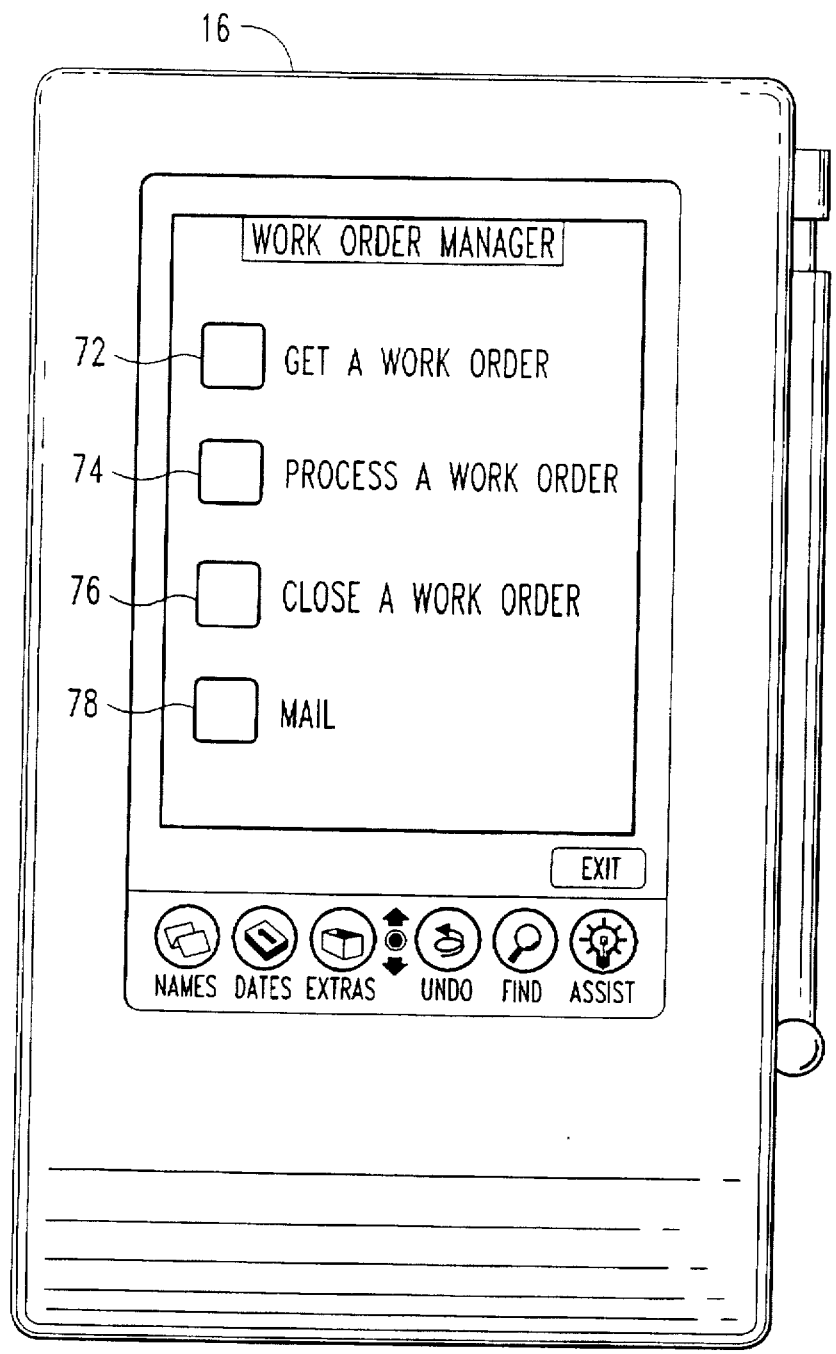

If the technician selects the work order manager 60, then, referring to FIG. 4, the application software provides a user friendly interface to the technician in order that the technician may choose to: get a work order 72, process a work order 74, close a work order 76, or perform a mail function 78.

Figure 5:
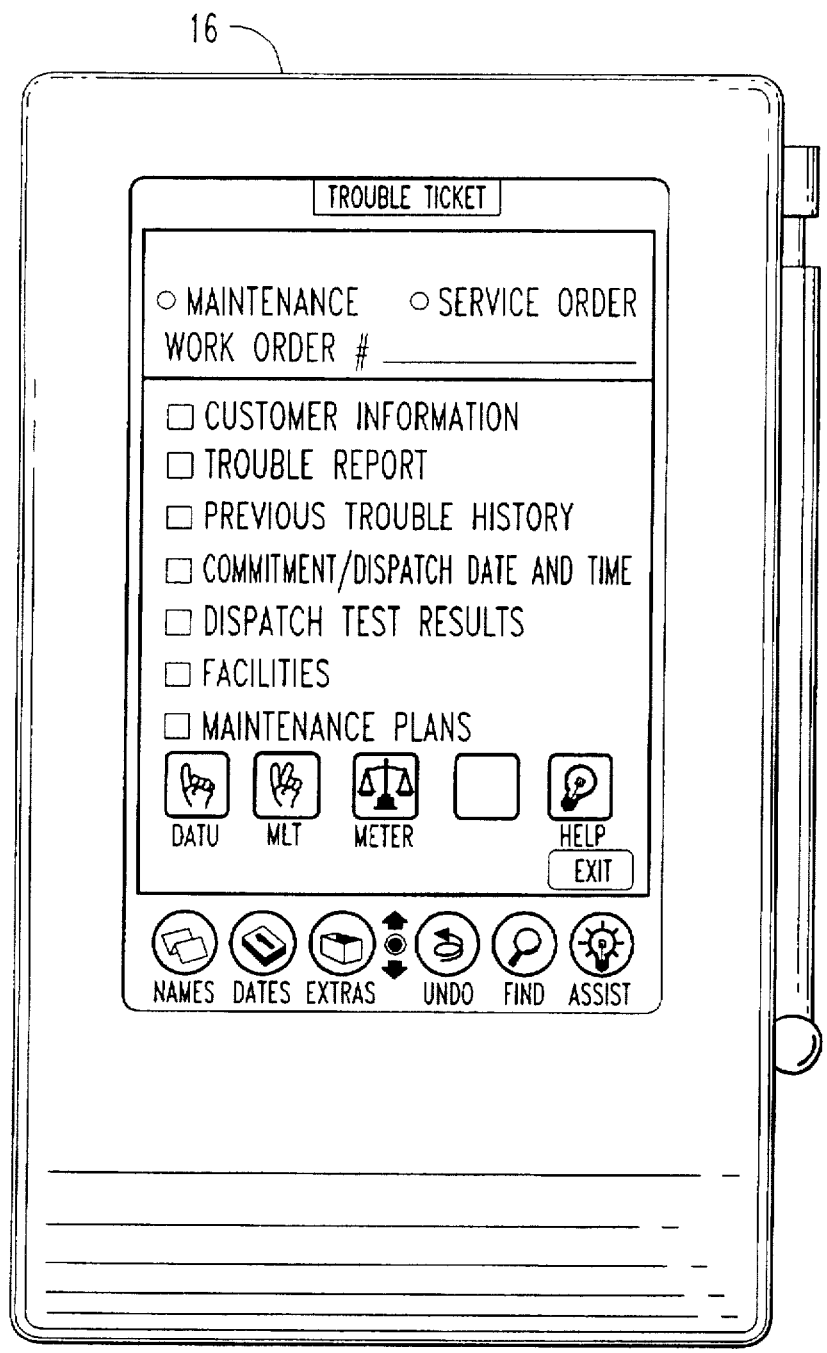
Figure 6:
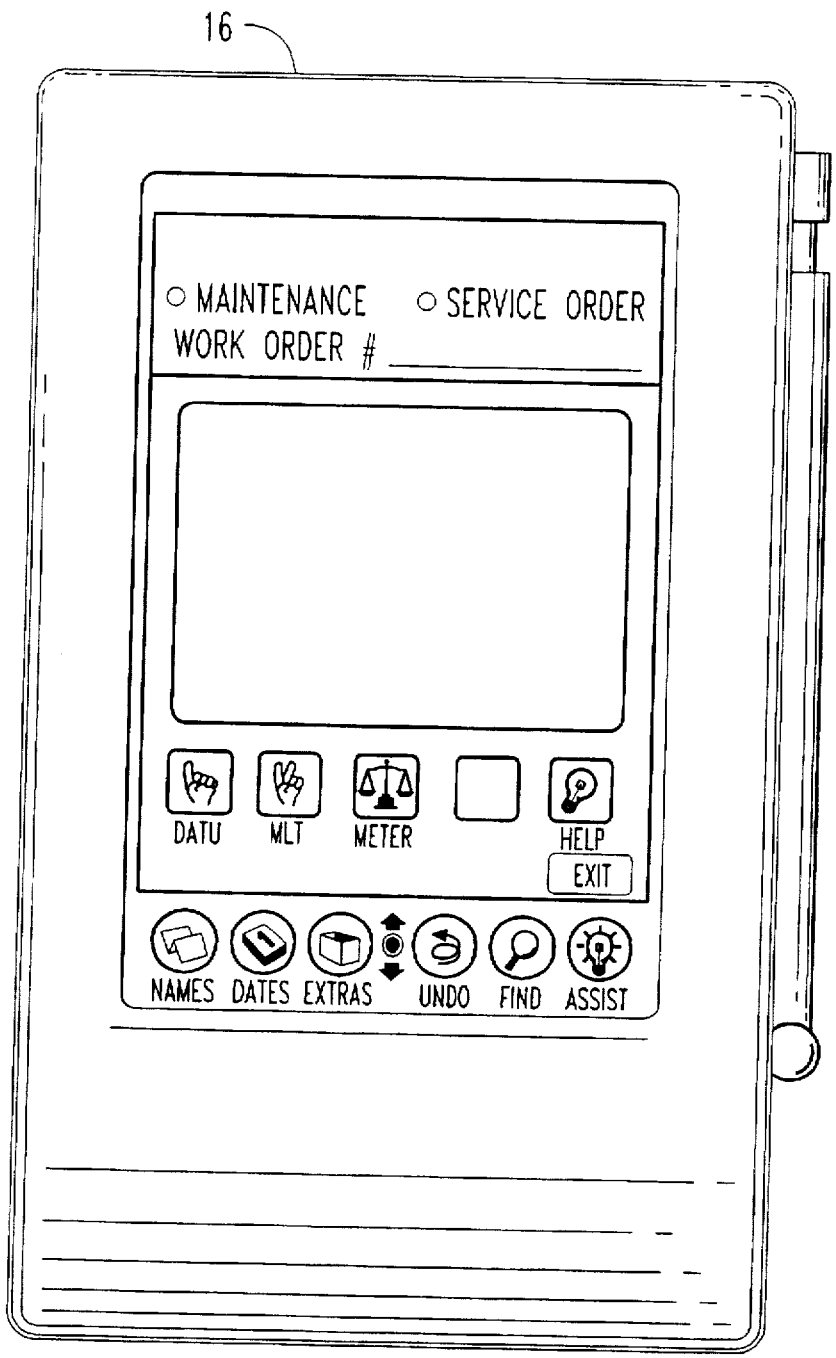
Figure 7:
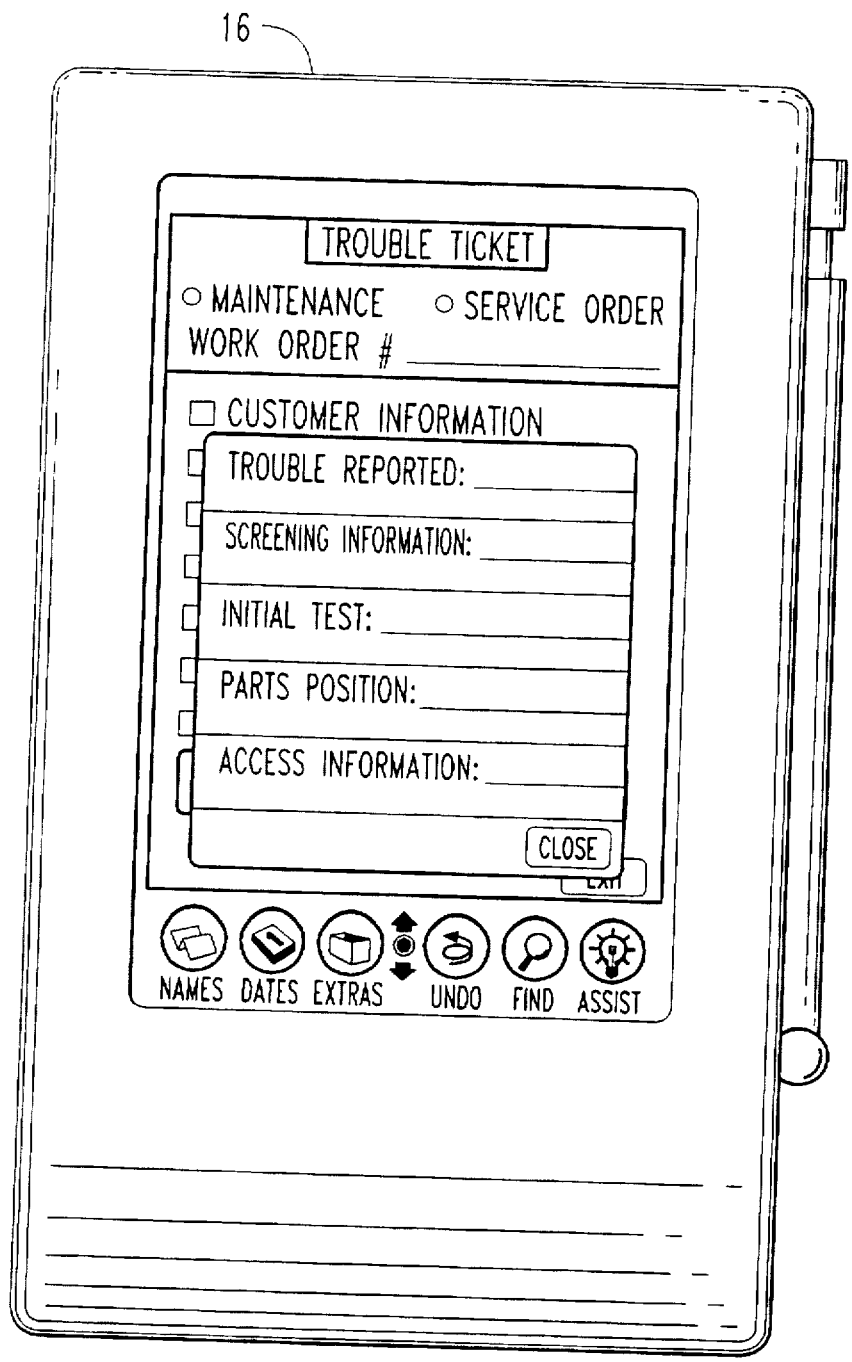
Figure 8:
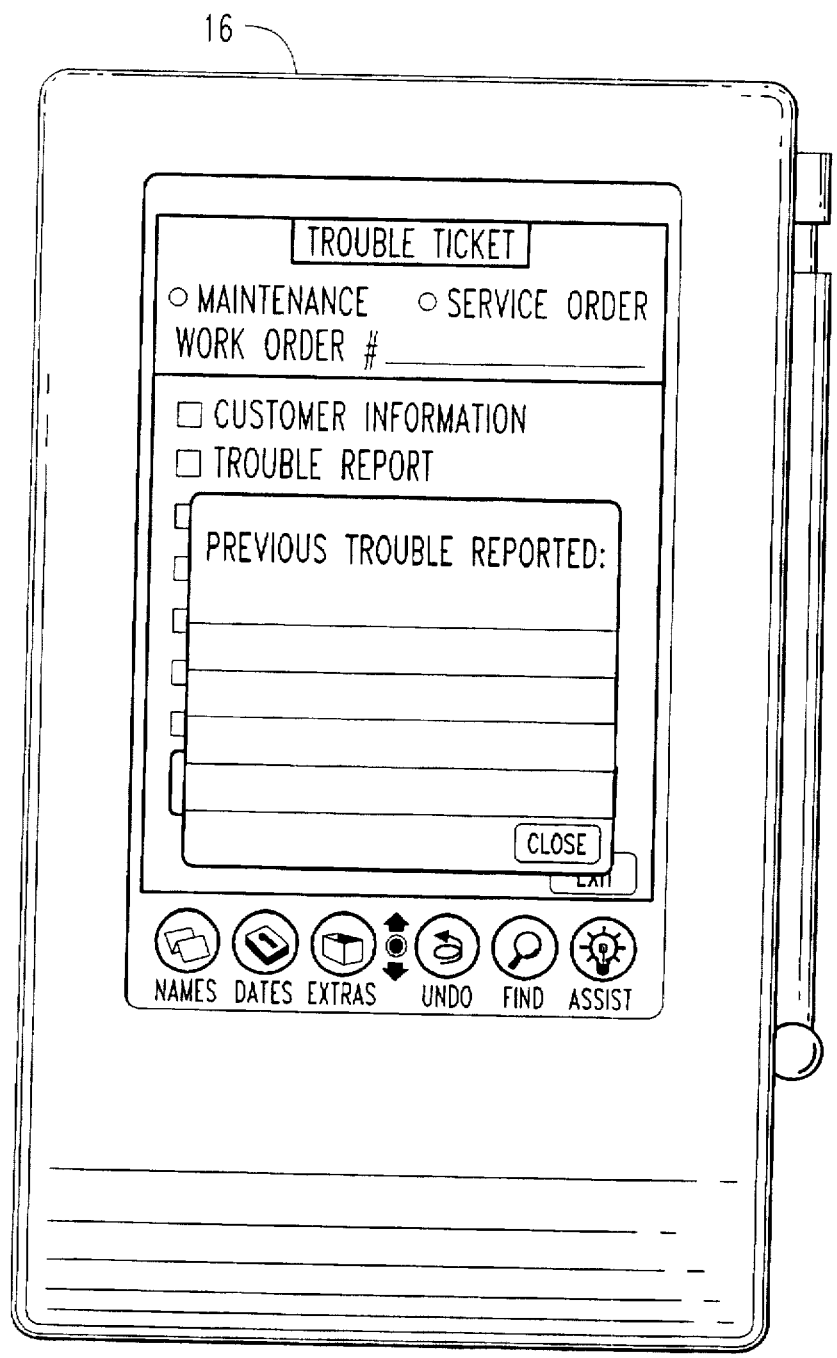
Figure 9:
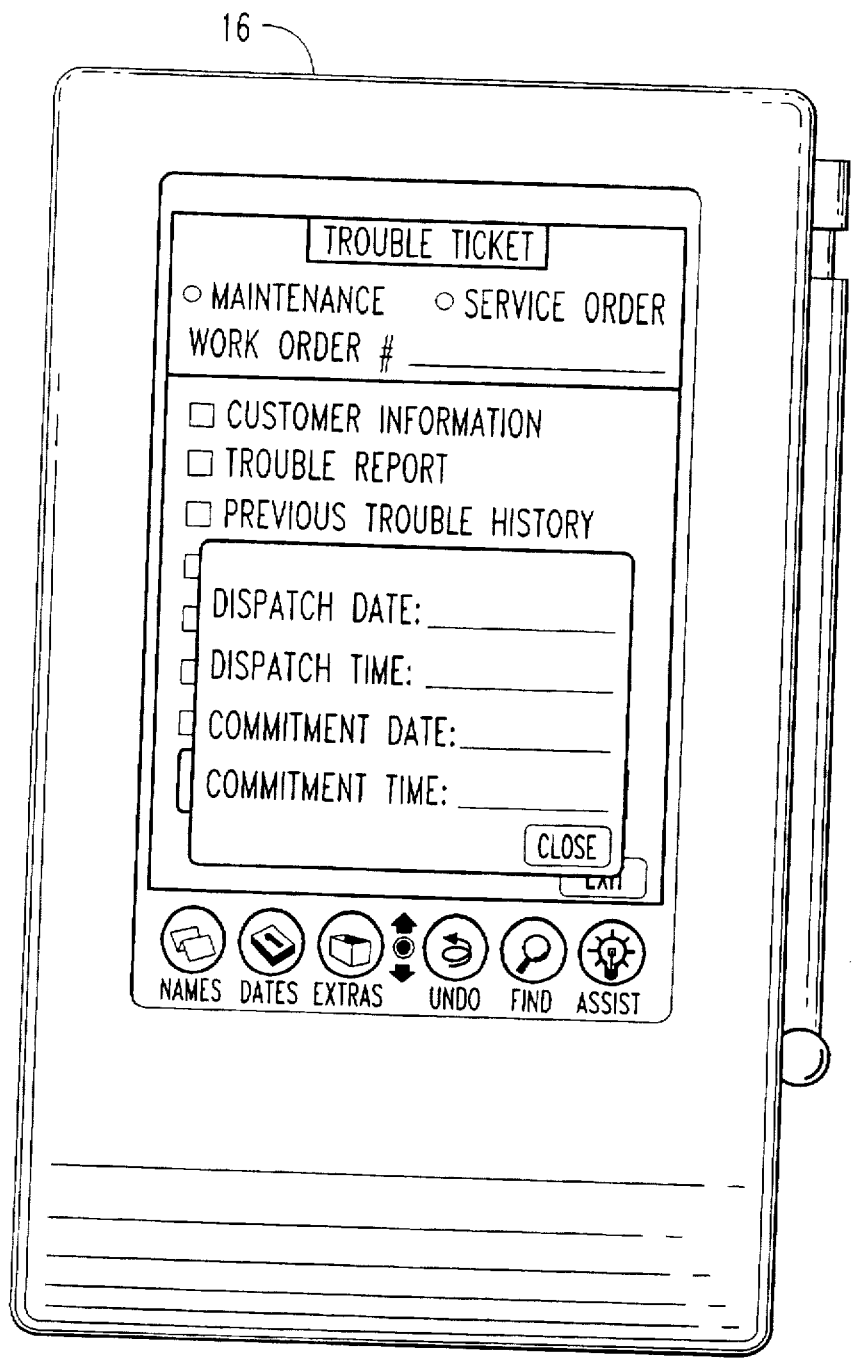

Referring to FIG. 5, there is shown the application software display for a work order selected in accordance with FIG. 4. The work order referred to in FIG. 5 allows the technician to select from among various pieces of information such as customer information, trouble reports, previous trouble history, etc. If the technician desires the customer information, for example, then the application software provides such information as shown in the display of FIG. 6. Similarly, FIG. 7 displays the trouble report information if selected by the technician. FIGS. 8 and 9 display the previous trouble history and the commitment/dispatch data and time selections. As can be seen from the above, the application software provides an easy and user friendly data flow for the technician in order to service the trouble report of the customer using the personal hand-held computer 16.

Figure 10:
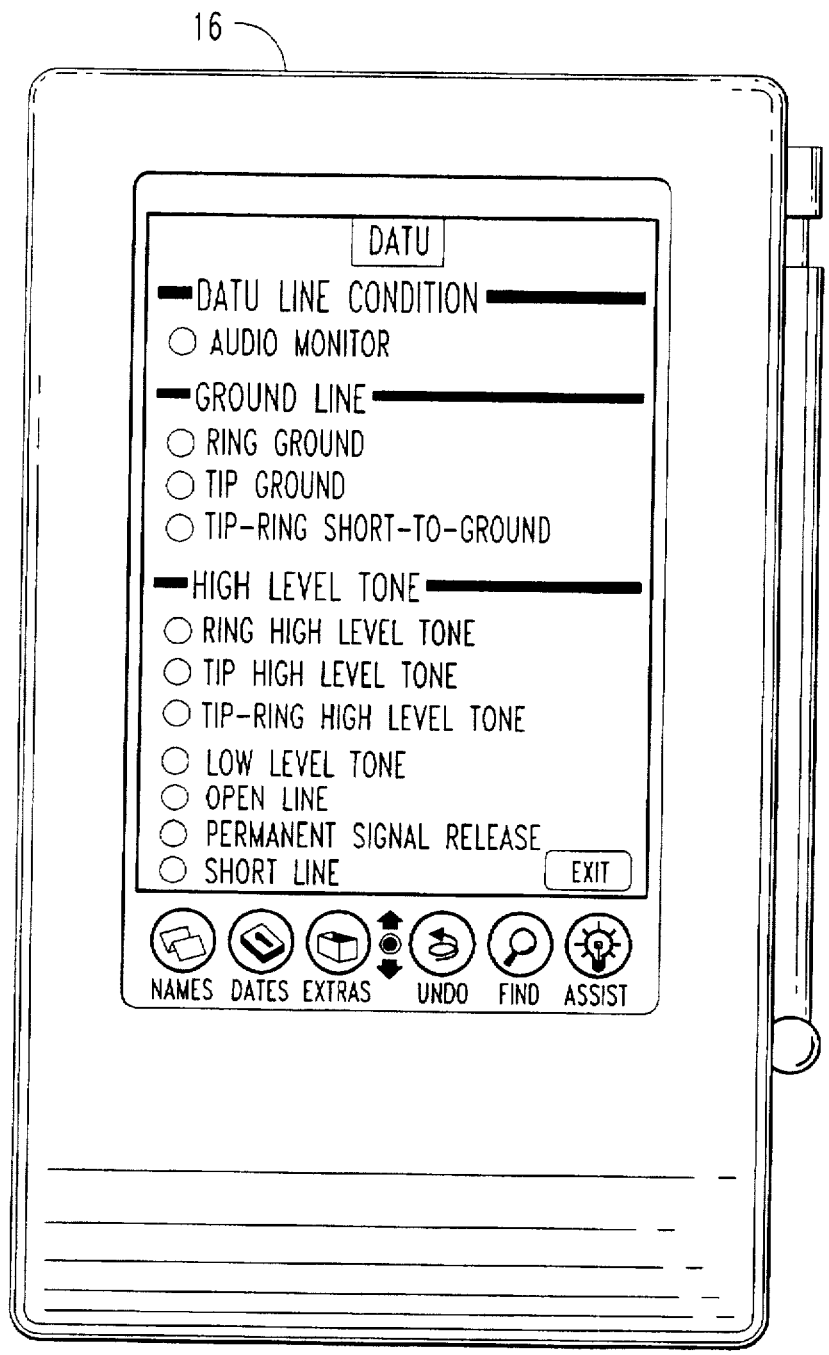

Referring back to FIG. 3, if the technician selects another support system such as DATU, then the application software operating on the personal computer 16 provides the technician with DATU line conditions as shown in FIG. 10. The application software fully integrates the DATU functions with any trouble report information, for example, phone number and translation into DATU phone number. As shown in FIG. 10, the technician need only select the proper DATU function such as ring ground, tip ground, tip-ring short-to-ground, full level tone, open line, etc. The application software on the personal hand-held computer 16 instructs the DATU system to perform the necessary tests transparent to the technician.

Figure 11:
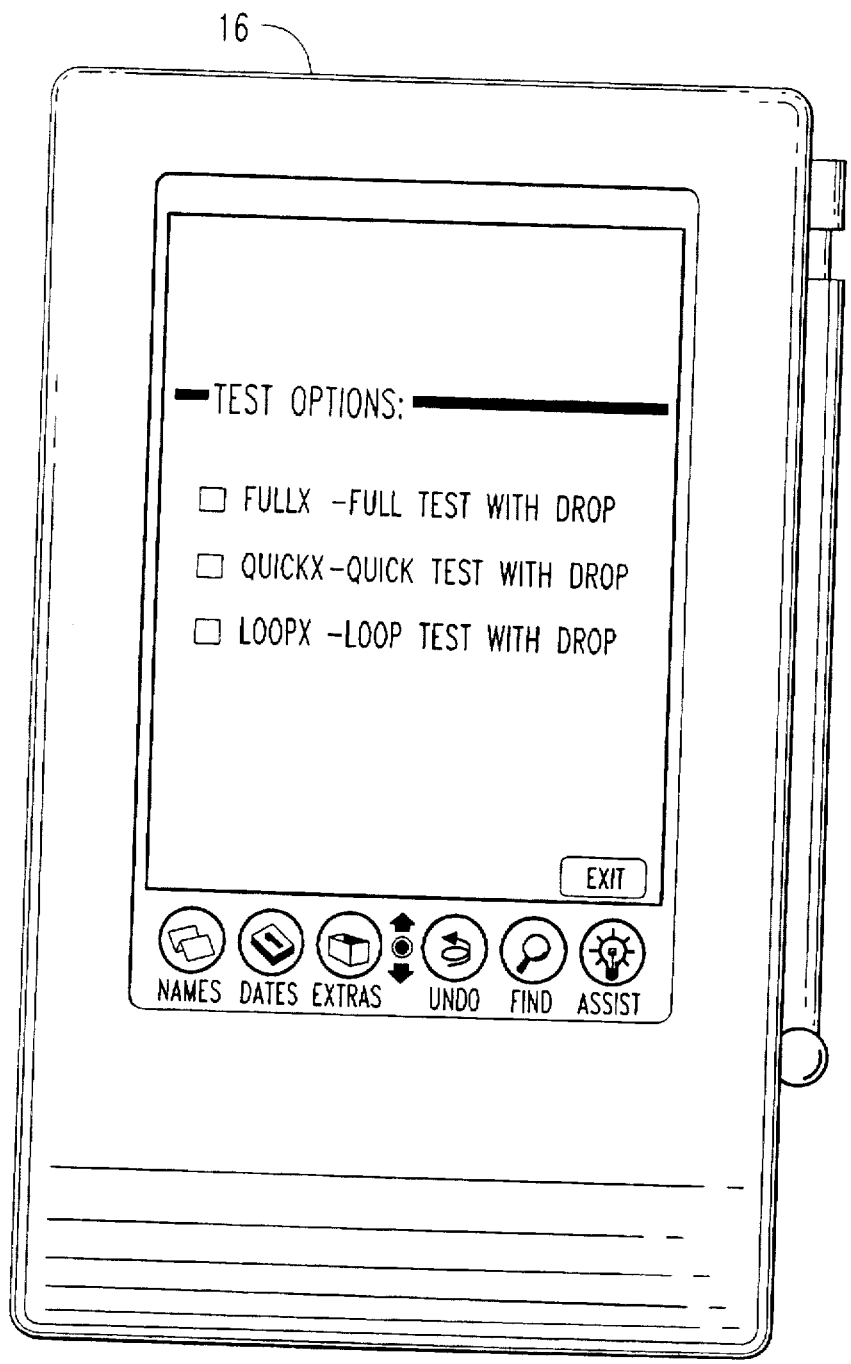
Figure 12:
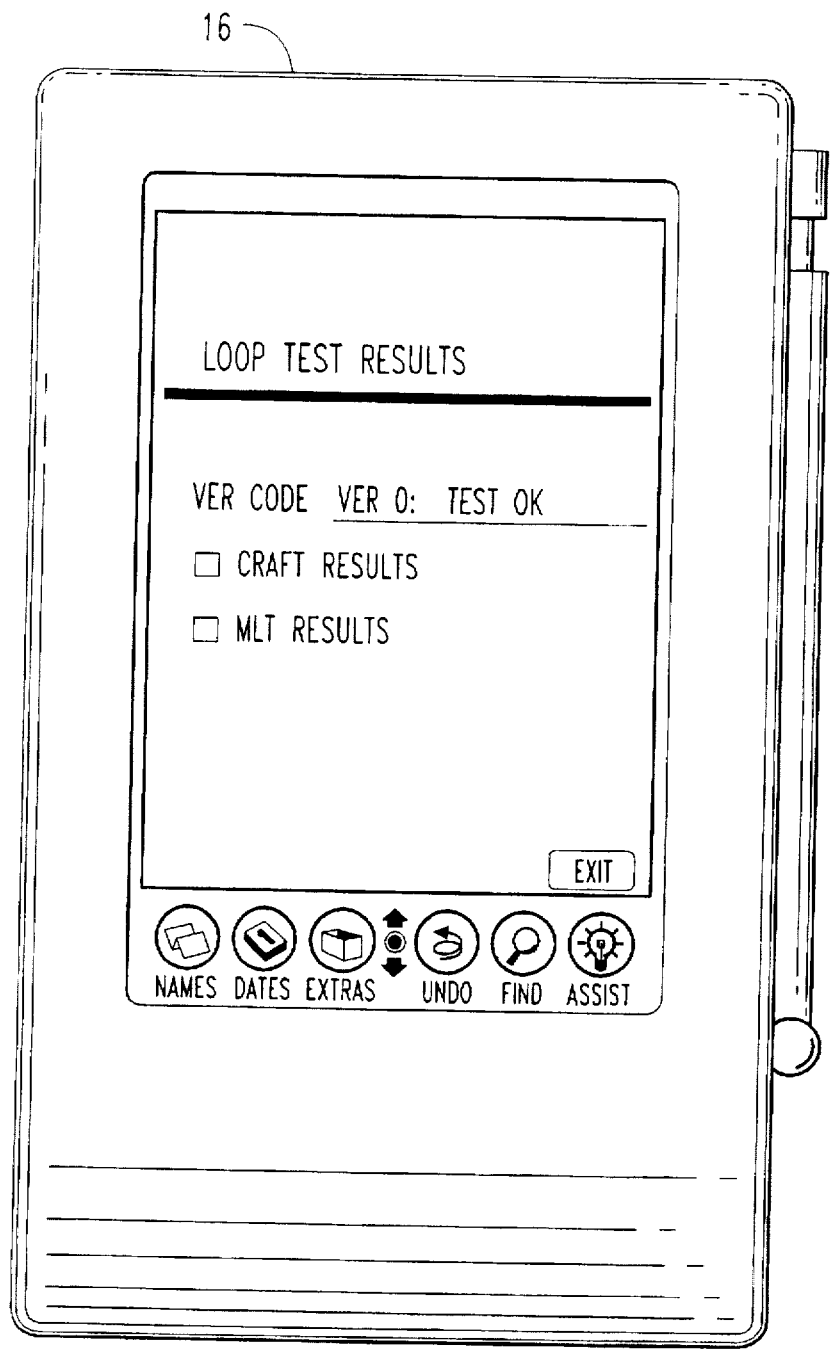
Figure 13:
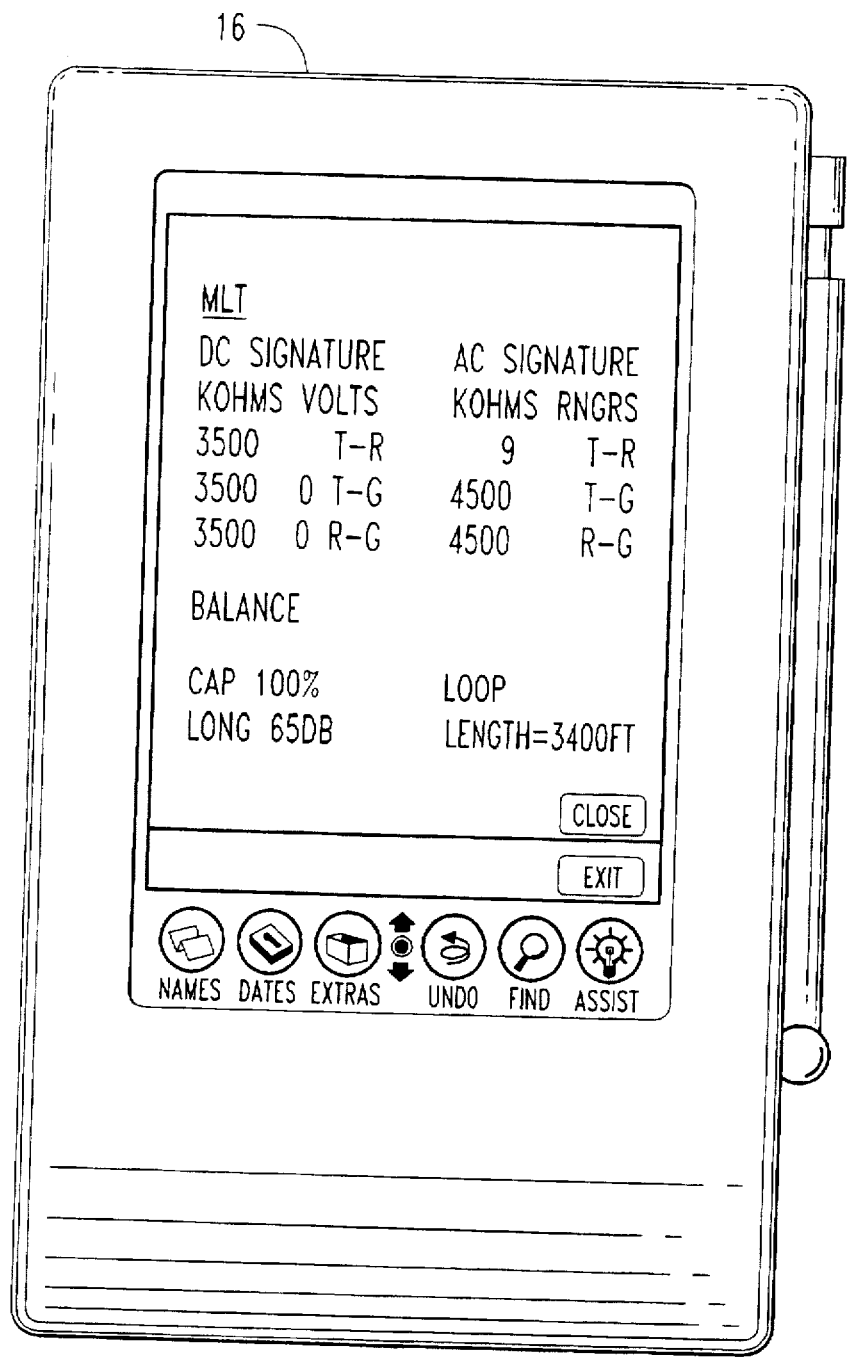
Figure 14:
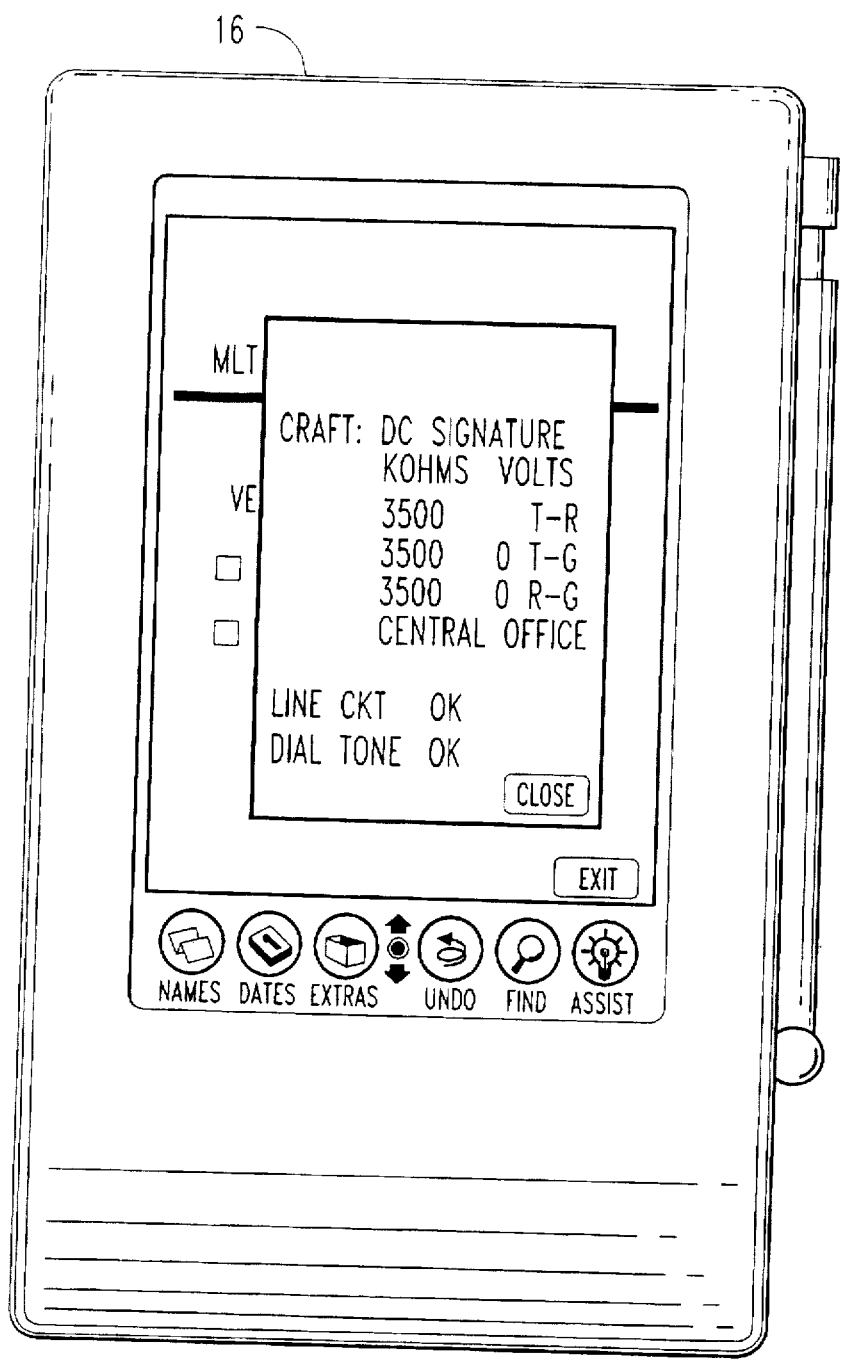

Again referring back to FIG. 3, if the technician selects the mechanized loop test (MLT) function, then the application software operates to display the test options as shown in FIG. 11. These options include a full test, quick test with drop, and a loop test with drop. The application software operates to integrate the trouble report information with the selected test requests in accordance with FIG. 11. For example, if the full test is selected, then the application software operates to prompt the technician to select either the craft results, i.e., the vehicle results, or the mechanized loop test results as shown in FIG. 12. If the craft results are selected, then the application software displays the results as shown, for example, in FIG. 13. Alternatively, the MLT results are shown in FIG. 14 for example.

Figure 15:
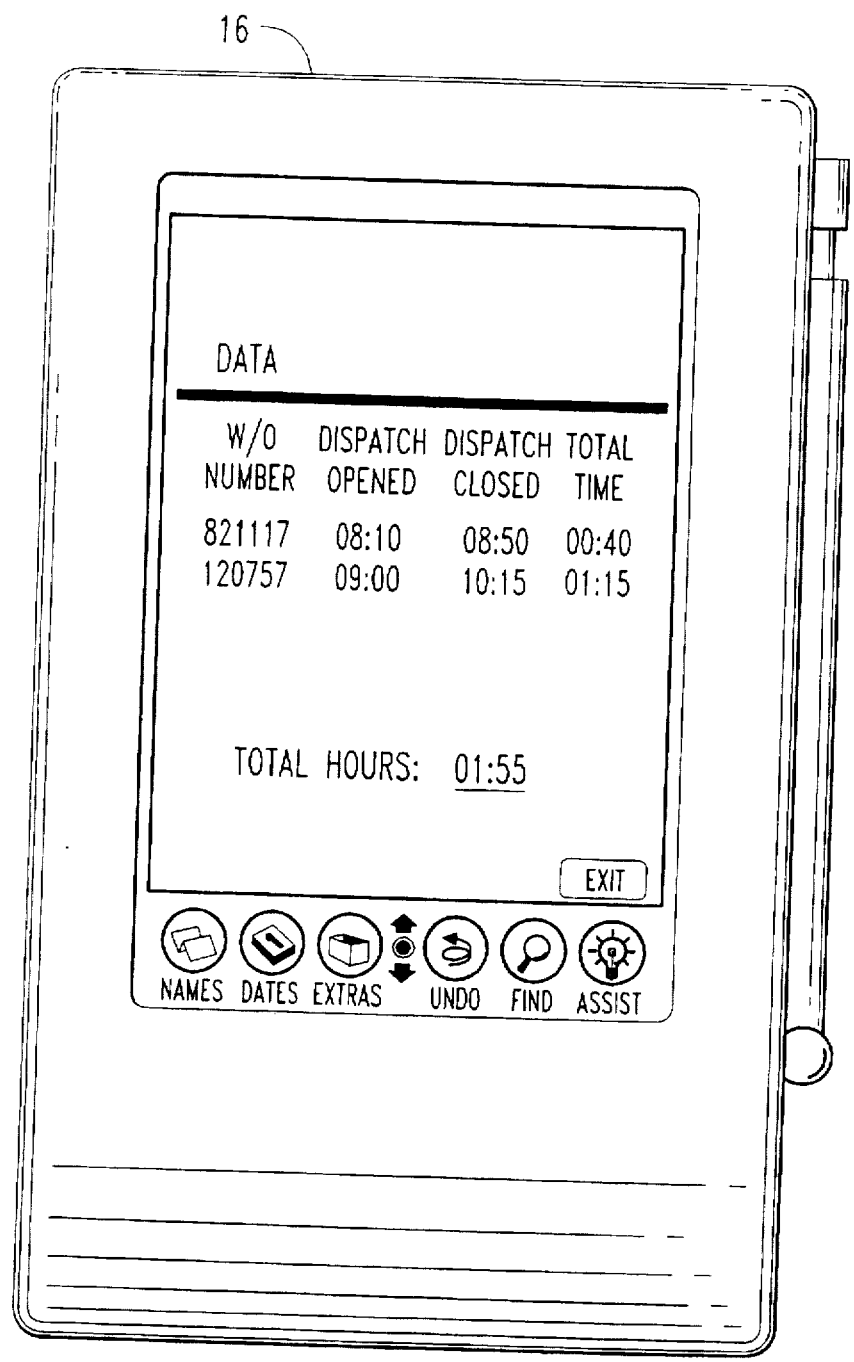

Again referring back to FIG. 3, if the display time sheet function 68 is selected, then the application software operates to display the time sheet as shown in FIG. 15. The time sheet automatically functions to collect the data from the trouble report orders.

As can be seen by the above examples, the application software provides a user friendly graphics interface allowing the technician to perform all sorts of testing and diagnostic functions on the line under test. This allows the telecommunication companies to use a lower skilled work force without the need for extensive training. The personal handheld computer 16 is capable of receiving and interpretating dispatch information into a set of automated sequences that can solve a trouble report in the most economical manner possible.

The personal hand-held computer 16 also allows the technician's vehicle to interact with all existing operational support systems as well as providing a platform for future information exchange.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A test system for a communication link to be tested comprising:
    a data acquisition device arranged to coupled to and derive a plurality of respectively different parameter measurement data from said communication link;
    a portable communication and processing unit having communication connectivity with said data acquisition device by way of at least a wireless transmission path, and being configured to receive and process said plurality of respectively different parameter measurement data from said data acquisition device; and
    a central office coupled with said communication link and being operative to place various test signals on said communication link being tested, and a further communication path between said portable communication and processing unit and said central office, said further communication path having wireless communication capability.

2. A system according to claim 1, wherein said data acquisition device comprises a portable test measurement device.

3. A system according to claim 1, wherein said portable communication and processing unit is operative to process said plurality of respectively different parameter measurement data into usable parameter information, and to transmit said usable parameter information to said central office via said further communication path.

4. A system according to claim 1, wherein said central office includes a line conditioning device for dialing said communication link under test and placing said various test signals on said communication link.

5. A system arrangement according to claim 1, wherein said portable communication and processing unit is operative to communicate with a test system of a telephone facility and with said data acquisition device, and wherein said portable communication and processing unit has a user interfacing input/output device, through which information associated with the operation of said test system is presented to said user.

6. A system according to claim 1, further comprising a data center, and a further communication path between said portable communication and processing unit and said data center, said further communication path having wireless communication capability.

7. A system according to claim 1, further comprising a mobile facility having an auxiliary wireless communication path with said portable communication and processing unit, and wherein said mobile facility is coupled in communication with said central office via one of a primary wireless path and a back-up wireline path.

8. A system according to claim 7, wherein said portable communication and processing unit is operative to process said plurality of respectively different parameter measurement data into usable parameter information, and to transmit said usable parameter information to said central office via said mobile facility.

9. A system according to claim 8, wherein said central office includes a line conditioning device for dialing said communication link under test and placing said various test signals on said communication link.

10. A system according to claim 4, wherein said line conditioning device comprises a direct access test unit.

11. A telecommunication test system for a subscriber line of a telephone network to be tested comprising:
    a test measurement device arranged to coupled to said subscriber line, and being operative to derive a plurality of respectively different parameter measurement data from said subscriber line;
    a portable communication and processing unit, through the operation of which testing of said subscriber line may be conducted by means of a test system of a telephone facility, said test system being operative to respond to signals supplied thereto over a communication path from said portable communication and processing unit and to supply messages to said portable communication and processing unit for providing information for controlling the operation of said test measurement device, said portable communication and processing unit having the capability of conducting communications through a wireless communication path to said test measurement device; and
    a mobile communication and signal processing facility, separate from said portable communication and processing unit and said telephone facility, through which a first auxiliary wireless communication path may be established with said portable communication and processing unit, and through which a second auxiliary wireless communication path may be established with said telephone facility.

12. A system arrangement according to claim 11, wherein said portable communication and processing unit is operative to communicate with said test system of said telephone facility and with said test measurement device, and wherein said portable communication and processing unit has a user interfacing input/output device, through which information associated with the operation of said test system is presented to said user.

13. A system according to claim 11, wherein said auxiliary communication and signal processing facility comprises a vehicle-supported communication and signal processing subsystem.

14. A system according to claim 11, wherein said telephone facility comprises a central office that includes a line conditioning device for dialing said subscriber line and placing said various test signals on said subscriber line.

15. A telecommunication test system for a communication line to be tested, comprising:
    a test measurement device which is configured to be coupled with said communication line, said test measurement device deriving a plurality of respectively different parameter measurement data from said communication line;

a processor which receives and processes said respectively different parameter measurement data;

at least one communication path provided between said test measurement device and said processor for conveying said plurality of respectively different parameter measurement data from said test measurement device to said processor, said at least one communication path including a wireless communication path; and a central office for placing various test signals on said communication line being tested; and wherein said at least one communication path includes a further wireless communication path between said processor and said central office.

16. A system according to claim 15, wherein said test measurement device comprises a portable test measurement device.

17. A system according to claim 15, wherein said processor comprises a hand-held personal computer unit through which a technician conducts a plurality of respectively different tests of said communication line.

18. A system according to claim 15, wherein said processor is operative to conduct spread spectrum communications over said wireless communication path with said test measurement device.

19. A system according to claim 15, wherein said wireless path comprises an infrared communication path.

20. A system according to claim 17, wherein said processor is operative to process said parameter measurement data into usable parameter information, and to transmit said usable parameter information to said central office via said further wireless communication path.

21. A system according to claim 20, wherein said further wireless communication path is an analog communication path.

22. A system according to claim 20, wherein said further wireless communication path is a digital communication path.

23. A system according to claim 15, wherein said central office includes a line conditioning device for dialing said communication line and placing said various test signals on said line.

24. A system according to claim 15, further comprising a voice activated headset wirelessly connected to said processor.

25. A telecommunication test system for a line to be tested, comprising:

a test measurement device coupled with said line, and being operative to derive a plurality of respectively different parameter measurement data from said line;

a processor which receives and processes said parameter measurement data from said test measurement device;

a first, wireless communication path, coupled between said test measurement device and said processor, for transmitting said plurality of respectively different parameter measurement data from said test measurement device to said processor;

a central office and a data test center for placing various signals on said line; and a mobile facility coupled in communication with said processor by way of a primary wireless path and a back-up wireline path, and also coupled in communication with at least one of said central office and said data test center by way of a further primary wireless path and a further back-up wireline path.

26. A system according to claim 25, wherein said test measurement device is a portable test measurement device.

27. A system according to claim 26, wherein said processor comprises a hand-held personal computer unit through the operation of which a technician conducts a plurality of respectively different tests of said line.

28. A system according to claim 25, wherein said processor is operative to conduct spread spectrum communications over said wireless communication path with said test measurement device.

29. A system according to claim 25, wherein said wireless path comprises an infrared communication path.

30. A system according to claim 25, wherein said processor is operative to process said parameter measurement data into usable parameter information, and to transmit said usable parameter information to said central office via said further wireless communication path.

31. A system according to claim 25, wherein said central office comprises a line conditioning device for dialing said line and placing various test signals on said line.

32. A system according to claim 25, wherein said mobile facility includes a network server providing additional processing power for said processor, an interface providing a short-haul wireless gateway to long-haul wireless services, a charge holder, and a printer.

* * * * *